Dec. 17, 1957 W. K. SQUIRES 2,816,953
HORIZONTAL DEFLECTION AND AUDIO OUTPUT CIRCUIT
Filed Aug. 12, 1954
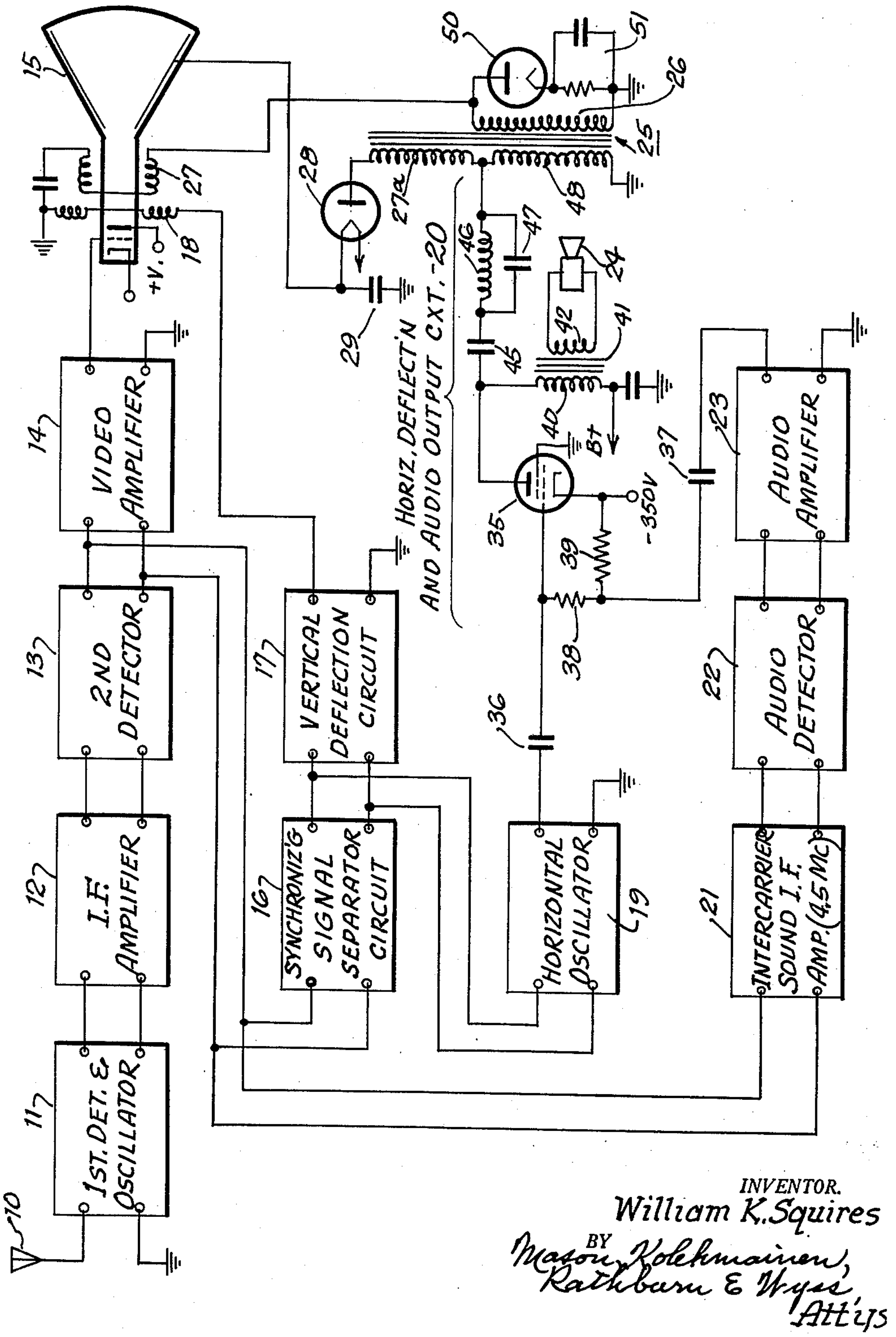
INVENTOR.
William K. Squires
BY
Mason, Kolehmainen, Rathburn & Wyss, Att'ys United States Patent Office 2,816,953
Patented Dec. 17, 1957

2,816,953

HORIZONTAL DEFLECTION AND AUDIO OUTPUT CIRCUIT

William K. Squires, Snyder, N. Y., assignor to Sylvania Electric Products, Inc., a corporation of Massachusetts Application August 12, 1954, Serial No. 449,424
10 Claims. (Cl. 178—5.8)

The present invention relates to television receivers, more particularly to the horizontal deflection and audio output portions of television receivers, and the invention has for an object the provision of a new and improved horizontal deflection and audio output tube circuit wherein the detected audio signal which accompanies the television picture signal may be amplified to the desired power output level in a simple and economical manner so that the cost of the television receiver may be substantially reduced.

In the television receiver field many arrangements have heretofore been proposed for electromagnetically deflecting the electron beam of the television picture tube in synchronism with the scanning process at the transmitter so as to reconstruct the transmitted image. These arrangements have uniformly included a deflection output tube of relatively large power requirements which is necessary to provide sufficient deflection energy, particularly in situations where cathode ray tubes of relatively large deflection angles are employed. In these prior art arrangements, it is also customary to provide a separate power output tube in the audio channel of the television receiver to amplify the detected signal to a power level sufficient to energize the loud speaker of the receiver. This audio power output tube also requires considerable plate current from the power supply of the television receiver and constitutes a relatively expensive unit of the receiver.

It is, therefore, another object of the present invention to provide a combined horizontal deflection and audio output tube circuit for a television receiver wherein the detected audio signal may be amplified to the desired power output level in the horizontal deflection power output tube of the receiver so that the conventional audio power output tube is eliminated.

It is a further object of the present invention to provide a new and improved horizontal deflection and audio output tube circuit for television receivers wherein a single power output tube is employed to develop both a suitable horizontal deflection wave form and an audio signal of relatively high power level and wherein means are provided for preventing interaction between the horizontal deflection and audio output circuits of the common power output tube.

It is a still further object of the present invention to provide a combined horizontal deflection and audio output tube circuit for television receivers wherein a single power output tube is employed to develop both a suitable scanning wave and an audio signal of relatively high power level and wherein automatic frequency control of the horizontal deflection system is not required.

Briefly, in accordance with one phase of the invention, the television receiver is provided with a horizontal deflection system of the constant energy or so-called synchroflection type wherein a fixed amount of deflection energy is introduced into a deflection coil system during each horizontal cycle, this energy being introduced during the retrace periods of successive horizontal scanning cycles. In a horizontal deflection circuit of this type short pulses of energy are injected into the deflection coil system during the horizontal retrace intervals and the deflection coils discharge through a damper tube of low internal impedance during the horizontal trace intervals to provide a substantially linear change in current through the deflection coils. Such an arrangement has good immunity to noise impulses so that the conventional automatic frequency control circuit normally required to provide noise immunity is not required. Since the deflection energy is added to the deflection coil system only during the retrace interval of each scanning cycle, the power output tube of the deflection system is only required to conduct deflection current in short pulses of approximately 8 microseconds duration which occur at the 15,750 cycles per second horizontal scanning rate.

In accordance with the present invention, the detected audio signal, which is derived in any suitable manner from the received television signal, is coupled to a control electrode of the horizontal deflection output tube and an audio output transformer is coupled to the anode of the horizontal deflection output tube so that the audio signal is amplified to a suitable power level during horizontal trace periods when this tube would normally be cut off. The horizontal synchronizing pulses impressed upon the control grid of the common power output tube are preferably of sufficient amplitude to drive this tube to anode current saturation so that the audio signal impressed upon the tube does not modulate the anode current of the tube during periods when energy is introduced into the horizontal deflection system. In addition, suitable isolation means are provided between the horizontal deflection coil system and the audio output transformer, and the audio frequency range is so limited that the 15,750 cycle component of the horizontal deflection waveform or harmonies thereof are not reproduced in the loud speaker.

The invention, both as to its organization and method of operation, together with further objects and advantages thereof, will best be understood by reference to the following specification taken in connection with the accompanying drawing, in which the single figure thereof is a schematic diagram of a television receiver, partly in diagram form, which embodies the features of the present invention.

Referring now to the drawing, the system therein illustrated comprises a modulated carrier wave television receiver of the superheterodyne type including an antenna system 10, connected to a first detector and oscillator 11, to which are connected in cascade relation in the order named, an intermediate frequency amplifier 12, a second detector 13, a video amplifier 14 and a cathode ray tube viewing device 15. The detected modulation components from the detector 11 are coupled to a synchronizing signal separator circuit wherein the horizontal and vertical synchronizing pulses are separated, the vertical synchronizing pulses being connected to a vertical deflection circuit 17 so as to develop a suitable vertical scanning current in the vertical deflection coils 18 which surround the neck of the cathode ray tube 15. The horizontal synchronizing pulses from the separator 16 are impressed upon a horizontal oscillator 19 which supplies drive pulses of uniform amplitude and duration to the combined horizontal deflection and audio output circuit 20 of the present invention. The output of the second detector 13 is also coupled to an intercarrier sound I. F. amplifier 21 the output of which is connected to an audio detector 22 which detects the audio signal accompanying the received television picture signal and supplies the detected audio signal to the audio amplifier 23. The detected audio signal is amplified in the amplifier 23 and is supplied to the circuit 20 wherein suitable power amplification is provided to energize the loud speaker 24 of the television receiver in a manner to be described in more detail hereinafter.

Referring now more particularly to the horizontal deflection and audio output circuit 20 of the present invention in relation to the other portions of the receiver described generally above, the circuit 20 includes a horizontal output transformer indicated generally at 25, the transformer 25 being provided with a secondary winding 26 which drives the horizontal deflection coils 27 which surround the neck of the cathode ray tube 15. The transformer 25 is also provided with a tertiary high voltage winding 27*a* and a high voltage rectifier 28 provides an accelerating anode potential across the filter condenser 29 for the second anode of the cathode ray tube 15. A combined deflection and audio power output tube 35, preferably of the commercial type 6Y6G, is provided in the circuit 20 and the horizontal drive pulses which are developed by the oscillator 19 are coupled through the condenser 36 to the control grid of the tube 35. The relatively low power audio signal developed in the output of the audio amplifier 23 is also coupled through the condenser 37 and the grid leak resistor 38 to the control grid of the power output tube 35, a second grid resistor 39 being connected between the condenser 37 and the cathode of the tube 35. The cathode of the tube 35 is connected to the negative terminal of a relatively large unidirectional potential supply and the screen grid of the tube 35 is connected directly to ground. The anode of the tube 35 is connected through a primary winding 40 of an audio output transformer 41 to the positive terminal of the B+ supply, the secondary winding 42 of the audio output transformer 41 being connected to energize the voice coil of the loudspeaker device 24 of the receiver. The anode of the tube 35 is also connected through a high pass filter circuit including the condenser 45 and the parallel connected inductance 46 and condenser 47 to the primary winding 48 of the horizontal output transformer 25.

Considering first the operation of the circuit 20 in developing a suitable horizontal deflection current in the coils 27, the positive horizontal drive pulses which are impressed upon the control grid of the tube 35 render this tube fully conductive during the horizontal retrace intervals so that anode current flows in the output transformer 25 and is stored in the deflection coils 27. Since these pulses are of relatively short duration and have a fundamental repetition rate of 15,750 per second, i. e., the horizontal scanning rate, the filter circuit 45, 46 and 47 presents relatively little series impedance at these frequencies so that very little impedance is included in the anode circuit of the tube to limit the maximum value of the anode current. In this connection it will be understood that since all the energy needed for deflection must be supplied during the comparatively short interval of the retrace period a relatively large peak anode current is required from the output tube 35. In some instances two output tubes of the commercial type 6Y6G connected in parallel will be required to provide the necessary deflection current. It will also be understood that the horizontal deflection transformer 25 is suitably designed to prevent transformer core saturation at the high peak currents required, as will be readily understood by those skilled in the art.

During the horizontal trace period the output tube 35 is not needed to supply current to the deflection system and is effectively disconnected from the horizontal deflection coils so that the deflection system "coasts" as energy flows out of the deflection coils. During this period, a damper tube 50 of relatively low internal impedance, which is connected in series with the filter network 51 across the secondary winding 26 the output transformer 25, is rendered conductive with the result that a substantially linear current change is produced in the horizontal deflection coils 27.

In order to prevent the audio signal impressed upon the control grid of the tube 35 from affecting the supply of energy to the deflection coils 27 during the retrace periods, the horizontal drive pulses impressed upon the control grid of the tube 35 are preferably of sufficient amplitude to drive the tube into the positive grid region so that anode current saturation is produced during periods when the tube 35 is rendered conductive by the horizontal drive pulses. With this arrangement, the audio signal causes substantially no variations in the peak anode current produced by the tube 35 during the retrace periods so that audio frequency modulation of the horizontal deflection system is avoided.

Considering now the operation of the circuit 20 in amplifying the audio signal to the required power output level simultaneously with the production of a horizontal deflection waveform in the manner described above, it will be understood that the audio response of the receiver is preferably limited to approximately 5,000 cycles and the transformer and speaker losses at 15,750 cycles per second, i. e., the horizontal scanning rate, are sufficient to prevent reproduction of the fundamental or harmonic components of the horizontal deflection waveform in the loudspeaker 24. If desired, a condenser of suitable value may be connected across the primary winding 40 of the transformer 41 to provide additional filtering at frequencies above the 5,000 cycle per second power audio limit, as will be readily understood by those skilled in the art. Since the tube 35 is a high vacuum tube and is required to conduct anode current for the horizontal deflection system only during the horizontal retrace intervals, the audio signal impressed upon the resistor 39 from the audio amplifier 23 is amplified in the tube 35 during the trace intervals and the amplified audio signal appearing at the anode of the tube 35 is coupled through the audio output transformer 41 to the loudspeaker 24 at a suitable power level to energize the voice coil thereof. The filter network 45, 46 and 47 constitutes a high pass filter having a cut-off frequency of approximately 10,000 cycles per second, i. e., somewhat above the upper audio limit of 5,000 cycles per second, but well below the fundamental scanning rate of 15,750 cycles per second, so that the audio frequency signal developed across the primary winding 40 of the audio output transformer 41 is effectively disconnected from the horizontal output transformer 25 during the trace intervals. As a result the amplified audio signal is prevented from interacting with the scanning current developed in the deflection coils 27 and audio frequency variations of the horizontal scanning wave are substantially eliminated.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In a television receiver provided with a horizontal scanning circuit of the type wherein short pulses of energy are developed by a power output tube and are injected into the deflection coils during the horizontal retrace intervals and the deflection coils discharge through a damper tube of low internal impedance during the horizontal trace intervals to provide a substantially linear change in current flow through said coils during said trace intervals, the combination of, means for detecting the audio signal accompanying a television picture signal received by said receiver, means for impressing said detected audio signal on a control electrode of said output tube, and means for deriving said detected audio signal from the anode circuit of said output tube.

2. In a television receiver provided with a horizontal scanning circuit of the type wherein short pulses of energy are developed in a power output tube and are injected into the deflection coils during the horizontal retrace intervals and the deflection coils discharge through a damper tube of low internal impedance during the horizontal trace intervals to provide a substantially linear change in current flow through said coils during said trace intervals, the combination of, means for detecting the audio signal accompanying a television picture signal received by said receiver, and means for transmitting said detected audio signal through said output tube to increase the power level of said detected audio signal by a predetermined amount.

3. In a television receiver provided with a horizontal scanning circuit of the type wherein short pulses of energy are developed in a power output tube and are injected into the deflection coils during the horizontal retrace intervals and the deflection coils discharge through a damper tube of low internal impedance during the horizontal trace intervals to provide a substantially linear change in current flow through said coils during said trace intervals, the combination of, means for detecting the audio signal accompanying a television picture signal received by said receiver, a loudspeaker, and means including said output tube for amplifying said detected audio signal to a power level sufficient to energize said loudspeaker.

4. In a television receiver, a horizontal deflection output tube, means for impressing a horizontal synchronizing signal on a control electrode of said tube, means for deriving a horizontal scanning waveform from the anode circuit of said tube, means for detecting the audio signal accompanying a received television picture signal, a loudspeaker, and means including said output tube for amplifying said detected audio signal to a power level sufficient to energize said loudspeaker.

5. In a television receiver, a combined horizontal deflection and audio output tube, means for impressing a horizontal deflection signal on an electrode of said tube, means for impressing an audio signal on an electrode of said tube, means for deriving a scanning waveform from said output tube, and means for deriving said audio signal in amplified form from said output tube.

6. In a television receiver, a combined horizontal deflection and audio output tube, means for impressing a deflection signal on an electrode of said tube, means for impressing an audio signal on an electrode of said tube, means for deriving a scanning waveform from said output tube, means for deriving said audio signal in amplified form from said output tube, and means for preventing interaction between said scanning waveform and said derived audio signal.

7. In a television receiver, a combined horizontal deflection and audio output tube, means for impressing a horizontal synchronizing signal on a control electrode of said tube, means for impressing an audio signal on a control electrode of said tube, means for deriving said audio signal from the anode of said tube in amplified form, a horizontal output transformer, and means including a high pass filter network connecting the anode of said tube to said horizontal output transformer for developing a horizontal scanning waveform in said transformer, said high pass filter having a cut-off frequency above the highest frequency of said audio signal so that said audio signal is prevented from interfering with said scanning waveform.

8. In a television receiver, a combined horizontal deflection and audio output tube, means for impressing horizontal synchronizing pulses on a control electrode of said tube to drive said tube to anode current saturation during the pulse intervals thereof, means for impressing an audio signal on a control electrode of said tube, an audio output transformer, means for deriving said audio signal from the anode of said tube and supplying the same to said audio output transformer, a horizontal deflection output transformer, and means including a high pass filter network connecting the anode of said tube to said horizontal output transformer for developing a horizontal scanning waveform in said transformer, said high pass filter having a cut-off frequency above the highest frequency of said audio signal so that said audio signal is prevented from interfering with said scanning waveform.

9. In a television receiver, a combined horizontal deflection and audio output tube, means for impressing horizontal synchronizing pulses on a control electrode of said tube, means for impressing an audio frequency signal on a control electrode of said tube, said pulses having sufficient amplitude to drive said tube to anode current saturation during the pulse intervals thereof, whereby said audio signal produces substantially no variation in the anode current of said tube during said synchronizing pulses, means including a horizontal deflection coil for deriving a scanning waveform from the anode circuit of said tube, means including an audio output transformer for deriving said audio signal from the anode circuit of said tube, and means for preventing audio frequency variations in said scanning waveform due to said audio signal.

10. In a television receiver, a combined horizontal deflection and audio output tube, means for impressing horizontal drive pulses of uniform amplitude and duration on a control electrode of said tube, means for impressing an audio frequency signal on a control electrode of said tube, said pulses having sufficient amplitude to drive said tube to anode current saturation during the pulse intervals thereof, whereby said audio signal produces substantially no variation in the anode current of said tube during said drive pulses, means including a horizontal deflection coil for deriving a scanning waveform from the anode circuit of said tube, means including an audio output transformer for deriving said audio signal from the anode circuit of said tube, and means for preventing audio frequency variations in said scanning waveform due to said audio signal, said last named means including a high pass filter network effectively connected between the anode of said tube and said deflection coil and having a cut-off frequency above the highest frequency component of said audio signal.

References Cited in the file of this patent

UNITED STATES PATENTS

| | | |
|---|---|---|
| 2,546,028 | Foster | Mar. 20, 1951 |
| 2,780,669 | Van Slooten | Feb. 5, 1957 |